(12) United States Patent
Matthews

(10) Patent No.: US 10,985,802 B2
(45) Date of Patent: *Apr. 20, 2021

(54) SYSTEM AND METHOD FOR HIGH SPEED DATA COMMUNICATIONS

(71) Applicant: AT&T Intellectual Property I, L.P., Atlanta, GA (US)

(72) Inventor: Adrian Matthews, Bridgewater, NJ (US)

(73) Assignee: AT&T Intellectual Property 1, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,439

(22) Filed: Feb. 25, 2020

(65) Prior Publication Data

US 2020/0195301 A1  Jun. 18, 2020

Related U.S. Application Data

(63) Continuation of application No. 15/787,152, filed on Oct. 18, 2017, now Pat. No. 10,615,847, which is a
(Continued)

(51) Int. Cl.
*H04L 12/18* (2006.01)
*H04B 3/54* (2006.01)
(Continued)

(52) U.S. Cl.
CPC ............ *H04B 3/542* (2013.01); *H04H 20/61* (2013.01); *H04H 20/69* (2013.01); *H04H 20/84* (2013.01);
(Continued)

(58) Field of Classification Search
USPC ........................................ 375/257; 340/12.32
See application file for complete search history.

(56) References Cited

U.S. PATENT DOCUMENTS

| 6,538,577 | B1   | 3/2003 | Ehrke et al. |            |
|-----------|------|--------|--------------|------------|
| 8,797,150 | B2 * | 8/2014 | Chan ........ | H04B 3/542 |
|           |      |        |              | 340/12.32  |

(Continued)

OTHER PUBLICATIONS http://www.netgear.com/Products/PowerlineNetworking/PowerlineEthernetAdapters.aspx, Powerline Ethernet Adapters, Jan. 24, 2007.

(Continued)

*Primary Examiner* — Eva Y Puente
(74) *Attorney, Agent, or Firm* — Guntin & Gust, PLC; Douglas Schnabel

(57) ABSTRACT

A method is disclosed for delivering broadband video data to an end user device comprising transmitting broadband video data via a radio frequency transmitter to a home radio frequency receiver located at a residential power transformer providing electrical power to a home; coupling the broadband video data from the home radio frequency receiver to a first modem onto a copper power line electrically coupled to the residential power transformer; receiving the broadband data on a second modem from the copper power line; and sending from the second modem, different portions of the broadband data to each of a plurality of end user devices in the home. A system and computer program for performing the method are disclosed.

20 Claims, 6 Drawing Sheets

Related U.S. Application Data continuation of application No. 15/203,996, filed on Jul. 7, 2016, now Pat. No. 9,825,670, which is a continuation of application No. 11/604,667, filed on Nov. 27, 2006, now Pat. No. 9,391,723.

(51) Int. Cl.
*H04H 20/61* (2008.01)
*H04H 20/84* (2008.01)
*H04H 20/69* (2008.01)
*H01P 3/16* (2006.01)
*H04L 12/28* (2006.01)

(52) U.S. Cl.
CPC ............. *H04L 12/18* (2013.01); *H01P 3/16* (2013.01); *H04L 12/2814* (2013.01)

(56) References Cited

U.S. PATENT DOCUMENTS

| | | | |
|---|---|---|---|
| 8,826,265 B2* | 9/2014 | Vedantham | H04B 3/542 717/172 |
| 8,861,574 B2* | 10/2014 | Lai | H04B 3/542 375/219 |
| 9,571,980 B1 | 2/2017 | Apostolopoulos et al. | |
| 9,825,670 B2 | 11/2017 | Matthews | |
| 10,587,310 B1* | 3/2020 | Bennett | H04B 3/58 |
| 2002/0010870 A1 | 1/2002 | Gardner | |
| 2003/0224784 A1 | 12/2003 | Hunt et al. | |
| 2004/0114857 A1 | 6/2004 | Yan et al. | |
| 2006/0286946 A1 | 12/2006 | Akkarakaran et al. | |
| 2014/0286444 A1 | 9/2014 | Au et al. | |
| 2016/0014453 A1 | 1/2016 | Monk et al. | |
| 2016/0291595 A1 | 10/2016 | Halloran et al. | |
| 2016/0360208 A1 | 12/2016 | Perlman et al. | |
| 2018/0069597 A1 | 3/2018 | Matthews | |
| 2020/0186194 A1* | 6/2020 | Gilbert | H04B 3/56 |
| 2020/0244311 A1* | 7/2020 | Olsson | H04B 3/56 |

OTHER PUBLICATIONS

Bates, Bud, "Using Home Power Lines to Distribute Advanced IPTV Services in the Home", IP Television Magazine, Mar. 2006, pp. 64-71.
Chou, Joseph et al., "How DLNA and UPnP Will Enable Easy Home Video Networks", Engineering Times India, pp. 1-4.
Minotani, "Microwave Photonic Integrated Devices", NTI Review, vol. 14, No. 6, Nov. 2002, pp. 42-48.
Nagatsuma, Tadao, "Photonic Measurement Technologies for High-Speed Electronics", Meas. Sci. Technol. 13 (2002) 1655-1663.

* cited by examiner

SYSTEM AND METHOD FOR HIGH SPEED DATA COMMUNICATIONS

CROSS-REFERENCE TO RELATED APPLICATIONS

This application is a Continuation of U.S. patent application Ser. No. 15/787,152, filed Oct. 18, 2017, which is a Continuation of U.S. patent application Ser. No. 15/203,996, filed Jul. 7, 2016, now U.S. Pat. No. 9,825,670, which is a Continuation of U.S. patent application Ser. No. 11/604,667, filed Nov. 27, 2006, now U.S. Pat. No. 9,391,723. The contents of each of the foregoing are hereby incorporated by reference into this application as if set forth herein in full.

FIELD OF THE DISCLOSURE

The present disclosure relates generally to a method and apparatus for delivering digital information over broadband power line systems.

BACKGROUND

The communications industry is burgeoning with new applications and new customers signing up daily. The demand for installation of infrastructure to support new customers is fast out growing the ability of communication service providers to supply infrastructure. Present day service providers of broadcast cable-based communication networks typically run a fiber optic cable or coaxial cable to a reception point to provide new service to a customer. Running cable can be problematic, as it often requires digging or physical construction on premises to run communication cables.

DETAILED DESCRIPTION

Figure 1:
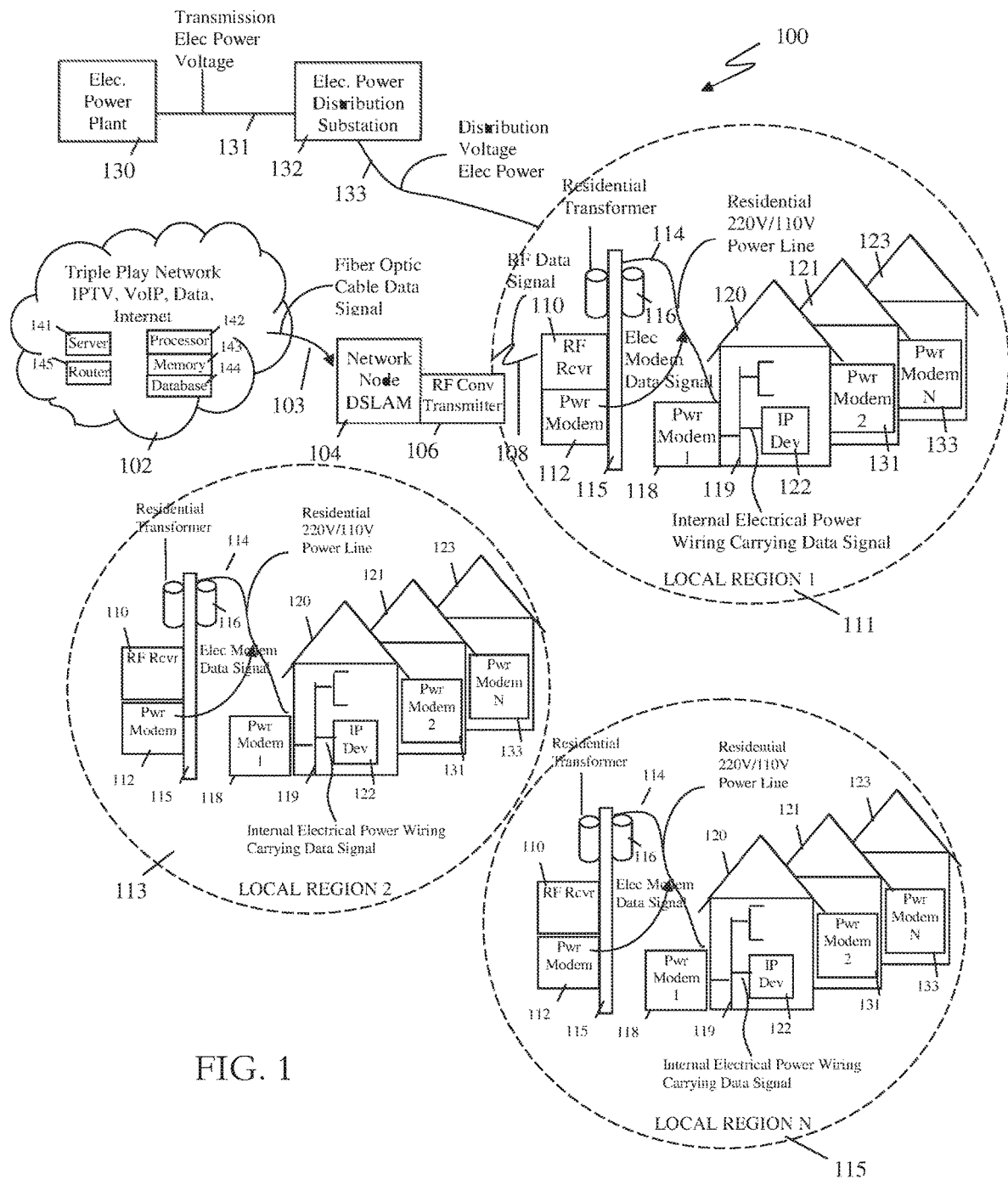
FIG. 1 depicts an illustrative embodiment of a system for delivering digital data to an end user device.

In a particular embodiment of the present invention a method for delivering data to an end user device is disclosed. The method includes receiving an optical signal containing broadband digital data; converting the optical signal to a first radio frequency signal; transmitting the first radio frequency (RF) signal from an RF transmitter to a first RF receiver in a first local region associated with the end user device; and converting the received radio frequency signal to a digital data signal. In another particular embodiment the method further includes placing the converted radio frequency digital data signal on electrical power wiring associated with the end user device. In another particular embodiment the RF signal comprises a band of RF frequencies. A first subset of the band of RF frequencies is associated with a first end user device and a second subset of the band of RF frequencies is associated with a second end user device and the first subset of frequencies and the second subset of frequencies do not overlap.

In another particular embodiment the method further includes transmitting a second RF signal to a second RF receiver in a second local region, wherein the first RF signal and the second RF signal do not interfere with each other in their local regions. In another particular embodiment the first and second RF signals share the same frequency band. In another particular embodiment the first subset of RF frequencies are encrypted using a first encryption key associated with the first end user device and the second subset of RF frequencies are encrypted using a second encryption key associated with the second end user device. In another particular embodiment converting the optical signal further comprises converting the optical signal using a uni-traveling carrier photodiode. In another particular embodiment the method further includes using a phase of the carrier signal for one of the group consisting of link management and enhanced power when link degradation occurs. In another particular embodiment converting the received radio frequency signal further comprises sampling the received signal using electro optic sampling. In another particular embodiment the RF transmitter is placed at a location selected from the group consisting of an electric power distribution substation, a residential power transformer, a residence and a triple play network node.

In another particular embodiment a system for delivering data to an end user device is disclosed. The system includes an optical converter in data communication with an optical signal containing broadband digital data, wherein the optical converter converts the optical signal to a first radio frequency signal and a first RF receiver in a first local region associated with the end user device, wherein the optical converter transmits the first radio frequency (RF) signal from an RF transmitter to the RF receiver and the RF receiver converts the received RF signal to a digital data signal. In another particular embodiment the system further includes an electrical power modem that places the converted radio frequency digital data signal on electrical power wiring associated with the end user device. In another particular embodiment wherein the RF signal comprises a band of RF frequencies and wherein a first subset of the band of RF frequencies is associated with a first end user device and a second subset of the band of RF frequencies is associated with a second end user device, wherein the first subset of frequencies and the second subset of frequencies do not overlap.

In another particular embodiment the transmitter transmits a second RF signal to a second RF receiver in a second local region, wherein the first RF signal and the second RF signal do not interfere with each other in their respective local regions. In another particular embodiment the first and second RF signals share the same frequency band. In another particular embodiment the first subset of RF frequencies are encrypted using a first encryption key associated with the first end user device and the second subset of RF frequencies are encrypted using a second encryption key associated with the second end user device.

In another particular embodiment the optical converter further comprises a uni-traveling carrier photodiode that converts the optical signal using the uni-traveling carrier photodiode. In another particular embodiment the converter uses a phase of the carrier signal for one of the group consisting of link management and enhanced power when link degradation occurs. In another particular embodiment the receiver further includes an electro optic sampling device for converting the received radio frequency using electro optic sampling. In another particular embodiment the RF transmitter is placed at a location selected from the group consisting of an electric power distribution substation, a residential power transformer, a residence and a triple play network node.

In another particular embodiment a computer readable medium containing a computer program of executable instructions, the computer program performing a method for delivering data to an end user device is disclosed. The computer program includes instructions to receive an optical signal containing broadband digital data; converting the optical signal to a first radio frequency signal; instructions to transmit the first radio frequency (RF) signal from an RF transmitter to a first RF receiver in a first local region associated with the end user device; and instructions to convert the received radio frequency signal to a digital data signal.

In another particular embodiment the computer program further includes instructions to place the converted radio frequency digital data signal on electrical power wiring associated with the end user device. In another particular embodiment the RF signal comprises a band of RF frequencies and wherein a first subset of the band of RF frequencies is associated with a first end user device and a second subset of the band of RF frequencies is associated with a second end user device, wherein the first subset of frequencies and the second subset of frequencies do not overlap. In another particular embodiment the computer program further includes instructions to transmit a second RF signal to a second RF receiver in a second local region, wherein the first RF signal and the second RF signal do not interfere with each other in their local regions.

In another particular embodiment the first and second RF signals share the same frequency band. In another particular embodiment the computer program further includes instructions to encrypt the first subset of RF frequencies using a first encryption key associated with the first end user device and encrypt the second subset of RF frequencies using a second encryption key associated with the second end user device. In another particular embodiment the instructions to convert the optical signal further comprises instructions to convert the optical signal using a uni-traveling carrier photodiode.

In another particular embodiment the computer program further includes instructions to use a phase of the carrier signal for one of the group consisting of link management and enhanced power when link degradation occurs. In another particular embodiment converting the received radio frequency signal further comprises sampling the received signal using electro optic sampling. In another particular embodiment the RF transmitter is placed at a location selected from the group consisting of an electric power distribution substation, a residential power transformer, a residence and a triple play network node.

An illustrative embodiment describes a method and apparatus for carrying optical-based digital information over millimeter wave radio frequency (RF) waves and broadband electrical power line systems. The illustrative embodiment transmission procedure has the merit of leveraging pre-existent low voltage residential wiring on the premises of an end user device to efficiently provide broadband access. Moreover, in a particular illustrative embodiment direct conversion of an optical signal to a millimeter-wave RF signal minimizes conversion losses, and facilitates digital communications at higher speeds. For instance, in a particular illustrative embodiment a uni-traveling carrier photo-diode may be used in the RF transmitter. In another particular illustrative embodiment are electro-optic sampling techniques may be used in the RF receiver. After reception at the premises or other location of a customer premises equipment or end user device, the information bearing RF signal is carried over a power line modem and placed onto the distribution low voltage electrical wiring at premises associated with an end user device. A user then communicates with the digital network by attaching one or more terminal end user devices to a matching power line modem and connecting an end user device anywhere onto the distribution wiring.

Multiple power line modems may be provided and used for sharing the available bandwidth, at which digital data is delivered at broadband optical speeds. A particular illustrative embodiment has the advantage of facilitating mass broadband communication techniques with the use of modern-day photonic techniques. In another particular illustrative embodiment WiFi equipment may also be added at the end user device location or used in place of the RF transmitter for enhanced digital data delivery and communications experience. The present disclosure targets the frequency band 30 GHz to 300 GHz and delivers Gigabit Ethernet speeds in excess of 1000 BASE-SX (1.25 Gbit/s), thus supporting various forms of bandwidth-sharing. The high speeds links will support converged services (VOIP, data, and full motion video) with minimal degradation to the combined converged service applications. The use of modern-day photonic techniques for transmission and reception also enables the use of the envelope of the transmission signal for passing data, while the phase of the transmission signal may be used for link management. In addition, the phase may be used for enhanced power output whenever link degradation occurs.

The illustrative embodiment of this disclosure enables mass and efficient delivery of converged packet services over high speed networks. When broadcast cable is used for these services, bandwidth delivery degrades with increasing number of users. This is because broadcast bandwidth is shared by all members of a broadcast reception audience. Every new added application is sent to every member of the broadcast audience even if it is inserted into the broadcast stream for only a few on only member audience. Switched packet broadband networks such as the triple play IPTV, VoIP and data network provide to distributed internet protocol data over a network of routers and servers, however, sends only the IP packet data intended for a particular audience member to that audience member rather than sending everything to everyone in the broadcast audience as in the broadcast communications model. IP data streams can be unicast and multicast to specific audience members only. The delivery of switched packet broadband services over digital subscriber lines (DSL) requires the presence of copper loops, which may be a problem for competitive local exchange carriers (CLECs). The use of the low voltage residential power distribution network allows rapid broadband access in a particular illustrative embodiment. The use of millimeter wave communications also presents a reusable or stackable technology. Since the RF communication links are short, interference is not a problem allowing proximate multiple instances, each in a particular local region close to an RF transmitter and proximate other local regions without RF interference between instances or local regions are.

A particular illustrative embodiment combines the use of photonic techniques and millimeter wave communications for high speed delivery of information, which can also be combined with signaling over the low voltage residential power grid for rapid deployment.

Photonic techniques supports broadband signaling, enabling high speed data to be delivered with limited or no degradation of video applications and also enable substantial bandwidth flexibility.

As shown in FIG. 1, in an illustrative embodiment a triple play IP network 102 which may include an internet protocol television (IPTV) system, a voice over internet protocol (VoIP) system, and a data delivery and internet service provider system sending digital data over fiber optic cables 103 to a network node such as a digital service line aggregate or multiplexer (DSLAM) 104. Each triple play network includes processors 142, memory 143, database 144, servers 141 and routers 145 which distribute internet protocol data to network nodes 104. The network 102 can be any source of digital data and is not limited to the triple play IP network shown in an illustrative embodiment. The network node is located adjacent to a RF converter transmitter 106 which converts the broadband data from the triple play IP network to an RF signal 108 in the range of 30-300 GHZ in an illustrative embodiment. The RF signal 108 is received by an RF receiver 110 in an illustrative embodiment at an electrical power pole 115 located adjacent a residence 120. The residence is associated with an end user device 122. The RF receiver 110 communicates converted digital data converted from the RF received signal to an electric power modem 112. The electric power modem 112 feeds the converted optical signal to the electric power line 114 which runs from the power pole distribution transformer 116 to the residence 120.

An electric power modem 118 is located at the residence 120 and receives the digital data and power from power line 114. The power modem 118 then extracts the digital data signal from the power line and communicates the extracted digital data to IP device 122. IP device 122 is plugged into the internal electrical line 119 upon which the power modem 118 communicates the data over the internal electrical wiring 119 to the IP device 122.

Also shown in FIG. 1 are adjacent residences 121 and 123 which contain power modems 131, 133 in which each power modem may operate within a different and unique separate frequency band thus the RF signal can be frequency multiplexed such that only a portion of the bandwidth of the RF signal from the receiver is used for each residence and each residence can share the bandwidth of the output RF signal from the RF receiver. Also shown in FIG. 1 is the electrical power source power generating plant 130 which transmits voltage at a high transmission power voltage to distribution substation 132 which steps down the transmission power voltage to a medium distribution voltage. The distribution substation transmits the transformed transmission power voltage at the medium distribution voltage power to local power poles 115 containing residential transformers 116 which reduce the distribution voltage to the low residential voltage level which is delivered to and used inside of the house on the internal electrical wiring at 220/110V. In another particular illustrative embodiment, available bandwidth is the bandwidth available at modem 112, in which modem 112 acts as a data source that shares its available bandwidth with modems 118, 131 and 133. Each of the modems can be identified by their respective machine address code (MAC) addresses. The individual devices that are attached to the modems with in the residences can be differentiated based on their individual internet protocol (IP) addresses.

The first local region 111 and a second local region 113 and other local regions 3-N can be served without RF interference between local regions as the RF signal transmitter 106 in each local region is chosen to deliver a signal having frequency and power so that the RF signal attenuates rapidly with distance from the RF transmitter 106. Thus a particular RF transmitter is effective only in its local region so that it doesn't interfere with a signal from another RF transmitter in another local region. RF transmitter can be set a different frequency bands in proximate regions to reduce interference.

Figure 2:
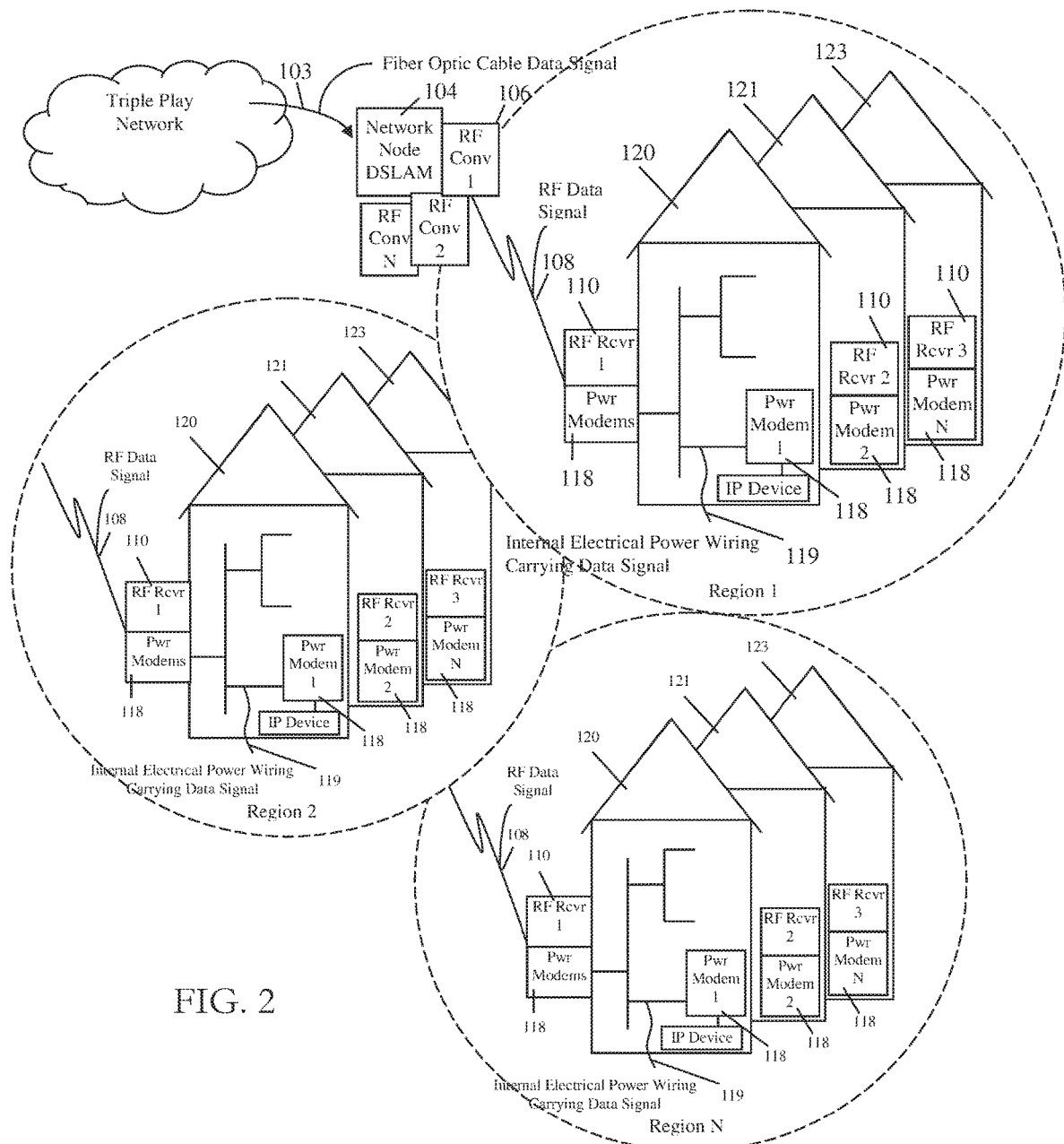
FIG. 2 depicts another illustrative embodiment of a system for delivering digital data to an end user device.

Turning now to FIG. 2 in another particular illustrative embodiment the triple play network digital data signal is routed via fiber optic cable to a network node or DSLAM 104 where RF converter 106 converts the fiber optic data signal 103 to a 30-300 GHZ RF data signal 108 which is transmitted directly to a RF receiver 110 at a residence 120. The RF receiver 110 converts the received RF signal to a converted digital signal and the power modem 118 places the converted digital signal on the internal electric low voltage power wiring 119. The internal power wiring delivers the data signal to internal power modem 118 which takes the digital data off of the internal power wiring and further communicates the digital data to end user devices such as IP device 122.

Also as shown in FIG. 2 are houses 121 and 123 which contain RF receivers 108, 110 2-N and associated power modems 118 wherein each receiver can be designed to receive in a different frequency band so that frequency division multiplexing can be used at the RF converter transmitter 106 to frequency multiplex or divide signals into different frequency bands intended for different residences or houses. The different frequency bands can be used so that each house receives at different frequency band and the bandwidth can be shared between residences. This way the triple play IP network and DSLAM node can assign particular multicast and unicast digital stream to particular frequency bands associated with one or more particular end user devices.

Each of the separate signals can also be separately encrypted such that only a house for which an encrypted data signal was intended can decrypt the data signal. In the case of encryption, the data signals can all be the same frequency or on separate frequencies such that frequency division multiplexing and encryption can be used together or separately.

Figure 3:
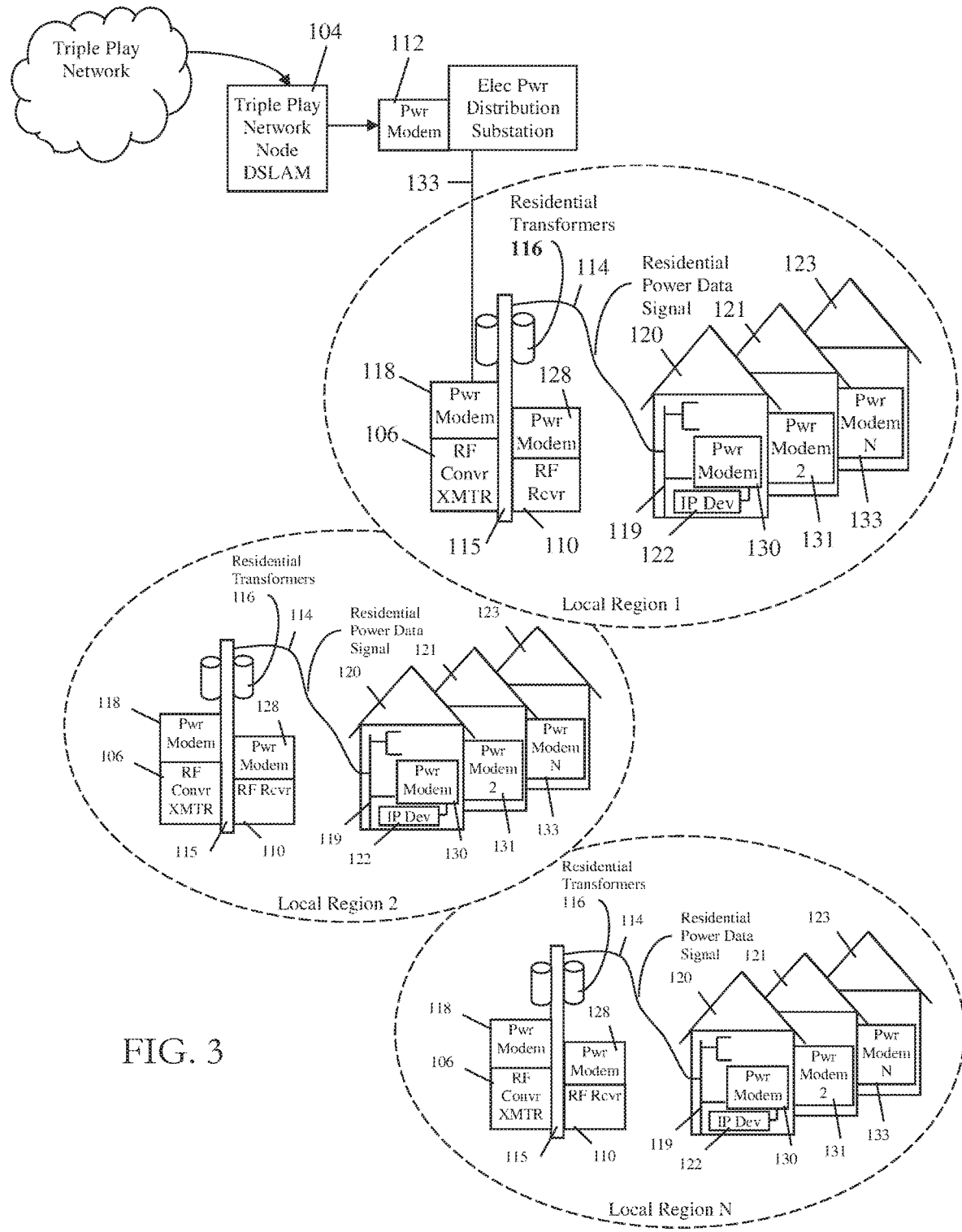
FIG. 3 depicts another illustrative embodiment of a system for delivering digital data to an end user device.

Turning now to FIG. 3, as shown in FIG. 3 in another particular illustrative embodiment a triple play IP network transmits a data signal on broadband speeds to a triple play IP network node such as a DSLAM. The DLSAM 104 transmits the IP digital data signal to a power modem 112 which places the digital data signal on a power line at the higher distribution voltage before it is stepped down to residential voltage (110/220 V) at the distribution voltage substation. When the distribution voltage power containing the data signal is received at a residential power pole 115 to be stepped down to residential 110/220 by residential transformers 116, the data signal on the distribution line is received by a power modem 118 and converted to an RF signal by a power converter and transmitter 106.

The RF receiver 110 receives the RF signal generated by power converter 106 and communicates the RF signal to the power modem 128 which places the data signal on the residential power line 114. The RF transmitter 106 and RF receiver 110 transfers the broadband digital signal across the residential transformer. The residential power line 114 containing the broadband data signal supplies power and data to the residences 120,121 and 123. Each residence includes an internal power modem 130, 131 and 132 that receives the power and data signal supplied from the residential power line 114 and converts the data transferred to the internal wiring 119 to a data signal which is then communicated to and end user device such as IP device 122. The end user device or IP device can be a personal computer or set top box or any other Internet protocol or digital data device capable of receiving a digital data signal. Digital data signals from the end user device or IP device which may comprise any end user device capable of receiving a digital data signal can also be transmitted back to the triple play IP network by sending a data signal in reverse direction retracing the path of the data in reverse back to the triple play IP network or another communication network. Wireless fidelity (WWI) or another wireless communication protocol can be used to distribute the data signal within or near a residence to end user devices.

Figure 4:
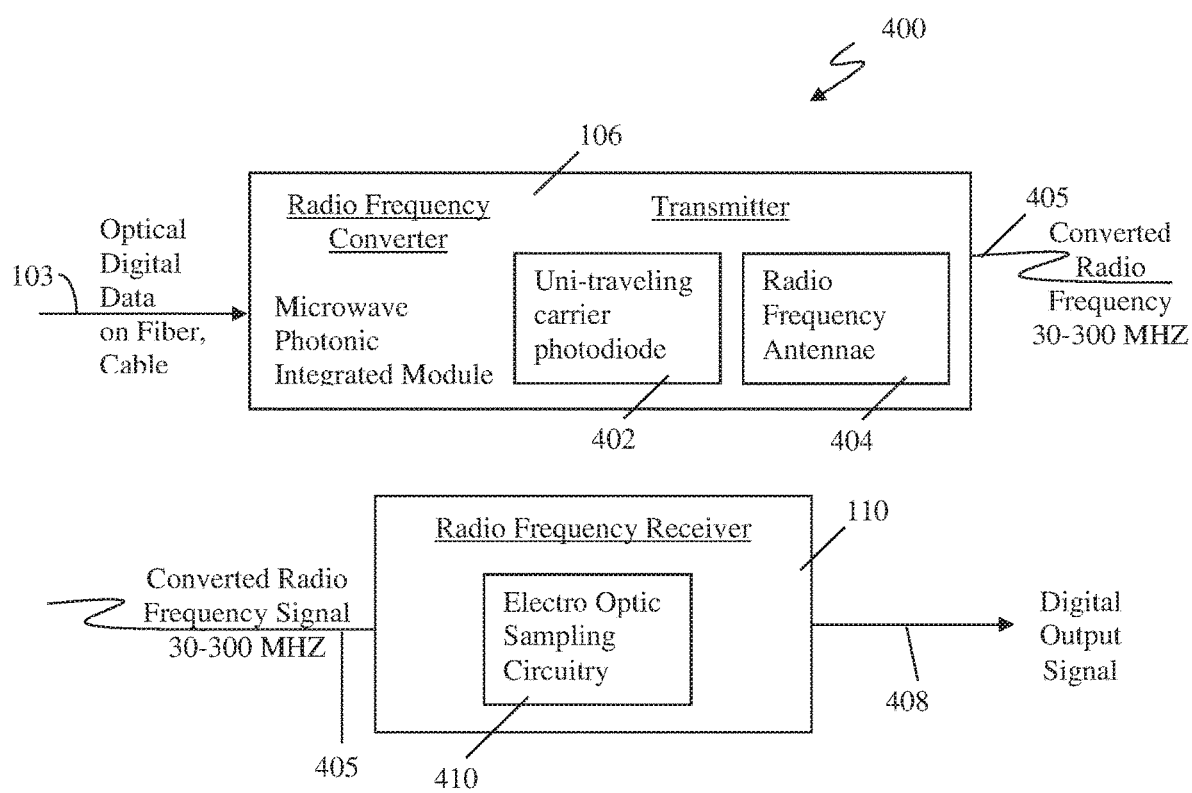
FIG. 4 depicts an illustrative embodiment of a converter, transmitter and receiver used to receive an optical signal, convert it and transmit the optical signal as a radio frequency signal.

Turning now to FIG. 4, in a particular illustrative embodiment an RF converter transmitter 106 receives an optical digital data signal 103 on a fiber optic cable from a triple play network node. In one particular illustrative embodiment, the RF converter transmitter contains a uni-traveling carrier photodiode 402 which converts the input optical digital data signal to an electrical signal which is coupled into the RF antennae or wave guide 404 and transmitted as a 30-300 GHZ RF signal 405. The RF receiver 110 further comprises an electro optical sampling circuit 410 which converts the received converted RF signal 405 to a digital output signal 408.

Photonic measurement technologies for high-speed electronics, including electro-optic sampling are described in Photonic Measurement technologies for high-speed electronics, T. Nagatsua, Institute of Physics Publishing, Measurement Science and Technology, Vol. 13, pp. 1655-1663 (2002), which is incorporated herein by reference in its entirety. Uni-traveling carrier photodiodes are described in Microwave photonic Integrated Devices, T. Minotani, S. Yagi, H. Ishii and T. Nagatsuma, NTT Review, Vol. 14, No. 6, November 2002, pp. 42-48, which is hereby incorporated by reference in its entirety.

There are numerous ways that data can be modulated on a millimeter-wave (MMW) and sent over a link. In another particular illustrative embodiment, the digital data is intensity-modulated on the optical signal before the optical signal reaches the uni-traveling carrier photodiode for MMW conversion. In this case, a harmonic mixer can be used to demodulate the transmitted MMW signal and a signal phase might not be available for secondary link control. In another particular embodiment, a the MMW signal may carry both amplitude and phase information over the transmission link and electro-optic sampling can is used for demodulation. In this case, the amplitude information is used for sending digital data and the phase information used for link control.

Figure 5:
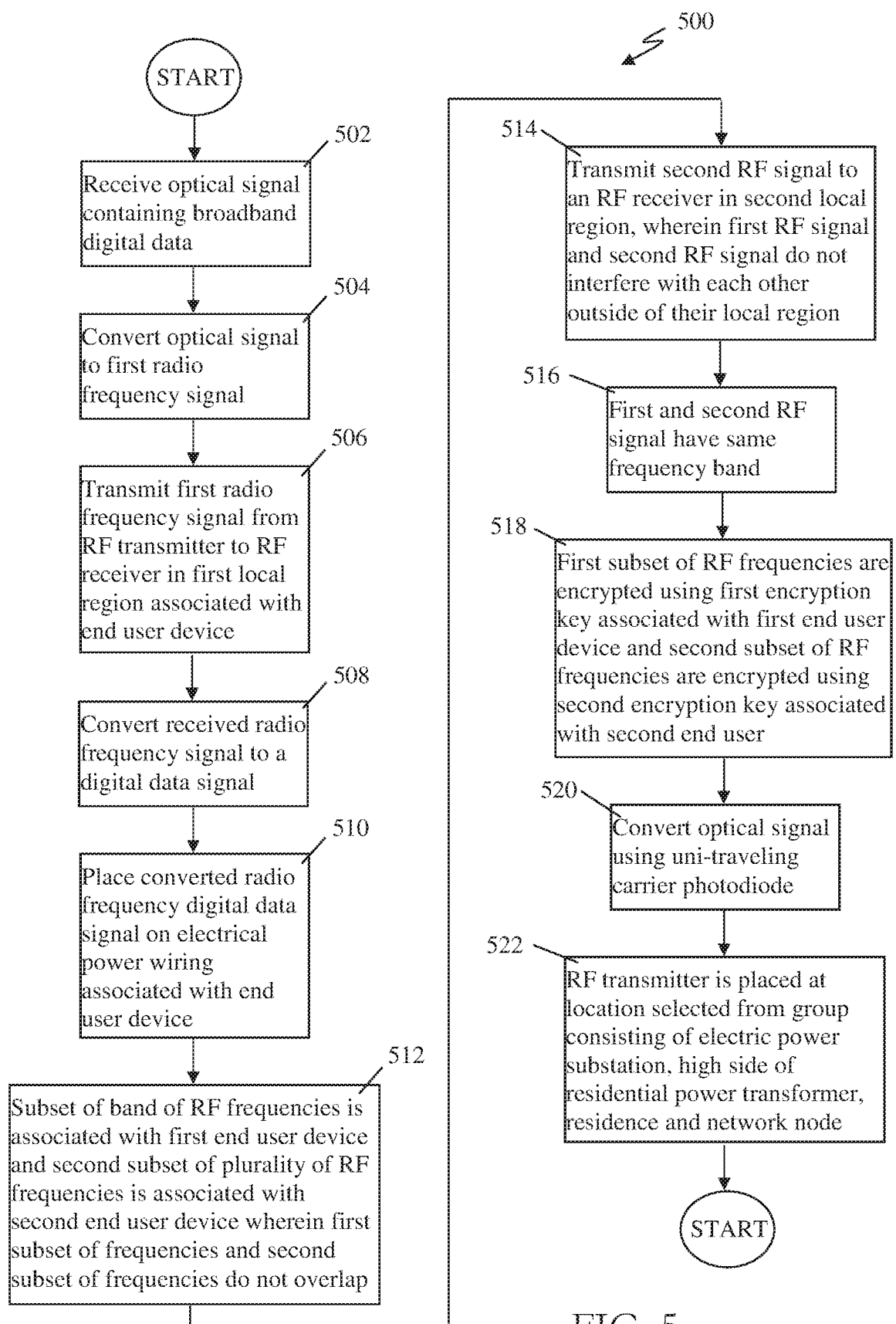
FIG. 5 depicts a flow chart of functions performed in a particular illustrative embodiment.

Turning now to FIG. 5, a flow chart of functions 500 performed in a particular illustrative embodiment is illustrated. An optical signal containing broadband digital data is received as shown at block 502. The optical signal is converted to a first radio frequency signal as shown at block 504. The first radio frequency signal is transmitted from RF transmitter to RF receiver in the first local region associated with the end user device as shown at block 506. The received radio frequency signal is converted to a digital data signal as shown at block 508. The converted radio frequency digital data signal is placed on the electrical power wiring associated with the end user device as shown at block 510.

In a particular illustrative embodiment, a subset of a band of RF frequencies is associated with a first end user device and a second subset of the band of RF frequencies is associated with a second end user device. In another particular embodiment, the first subset of the band of frequencies and the second subset of the band of frequencies do not overlap as shown at block 512. In another particular embodiment, the second RF signal is transmitted to an RF receiver in the second local region, so that the first RF signal and the second RF signal do not interfere with each other outside of their respective local regions as shown at block 514. In another particular embodiment, the first and second RF signals have same frequency band as shown at block 516. In another particular embodiment, the first subset of RF frequencies are encrypted using a first encryption key associated with a first end user device and a second subset of RF frequencies are encrypted using a second encryption key associated with a second end user device as shown at block 518. In another particular embodiment, the optical signal is converted using a uni-traveling carrier photodiode as shown at block 520. In another particular embodiment, the RF transmitter is placed at the location selected from the group consisting of an electric power substation, a high side of residential power transformer, a residence and a network node as shown at block 522.

Figure 6:
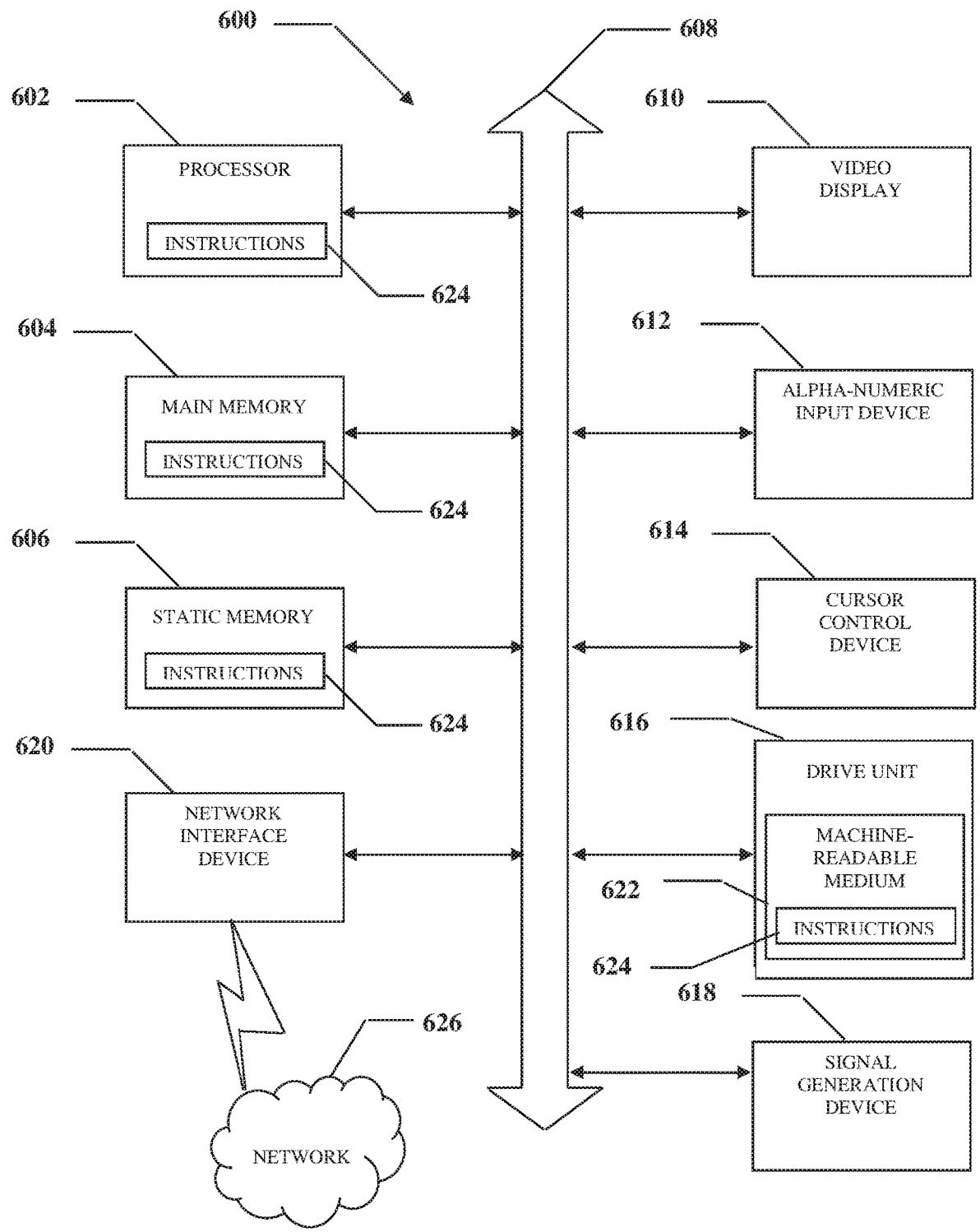
FIG. 6 is an illustrative embodiment of a machine for performing functions disclosed.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface 9.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
receiving, by a processing system including a processor, video data via a millimeter-wave signal at a first radio frequency receiver located at a first power transformer that provides electrical power at a location, wherein the video data is obtained wirelessly by the first radio frequency receiver from a network node, wherein a power of the millimeter-wave signal is limited so that the millimeter wave signal interacts with a first antenna at the first power transformer while not interacting with a second antenna at a second power transformer, and wherein the millimeter-wave signal is generated by converting an optical digital data signal using a photodiode; and transmitting, by the processing system, the video data by unicasting from the first power transformer to a modem at the location to deliver the video data to a plurality of end user devices at the location.

2. The method of claim 1, wherein a first plurality of radio frequency signals received at the first radio frequency receiver are associated with a first local region and wherein a second plurality of radio frequency signals received by a second radio frequency receiver are associated a second local region.

3. The method of claim 2, wherein the first plurality of radio frequency signals and the second plurality of radio frequency signals do not interfere with each other in their respective local regions.

4. The method of claim 1, wherein the millimeter-wave signal includes amplitude information and phase information.

5. The method of claim 1, wherein the millimeter-wave signal is demodulated by electro-optic sampling.

6. The method of claim 1, wherein the video data is received as encrypted data, and wherein the encrypted data is decrypted by a first end user device of the plurality of end user devices.

7. The method of claim 1, wherein the video data delivered to a first end user device of the plurality of end user devices is carried by a first frequency, wherein the video data delivered to a second end user device of the plurality of end user devices is carried by a second frequency, and wherein the first frequency differs from the second frequency.

8. The method of claim 1, further comprising transmitting, by the processing system, the video data to a second modem at a second location via a power line extending between the power transformer and the second modem at the second location to enable the second modem to send different portions of the video data to each of a second plurality of end user devices in the second location.

9. The method of claim 1, wherein the network node comprises a digital subscriber line access multiplexer.

10. A device, comprising:
a processing system including a processor; and
a memory that stores executable instructions that, when executed by the processing system, facilitate performance of operations, comprising:
receiving video data via a millimeter-wave signal at a first radio frequency receiver located at a first power transformer that provides electrical power at a location, wherein a power of the millimeter-wave signal is limited so that the millimeter wave signal interacts with a first antenna at the first power transformer while not interacting with a second antenna at a second power transformer, and wherein the millimeter-wave signal is generated by converting an optical digital data signal using a photodiode; and
transmitting the video data by unicasting from the first power transformer to a modem at the location to deliver the video data to a plurality of end user devices at the location.

11. The device of claim 10, wherein the video data is received as encrypted data, and wherein the encrypted data is decrypted by a first end user device of the plurality of end user devices.

12. The device of claim 10, wherein the video data is obtained wirelessly by the first radio frequency receiver from a network node.

13. The device of claim 12, wherein the network node comprises a digital subscriber line access multiplexer.

14. The device of claim 10, wherein a first plurality of radio frequency signals received at the first radio frequency receiver are associated with a first local region and wherein a second plurality of radio frequency signals received by a second radio frequency receiver are associated a second local region.

15. The device of claim 14, wherein the first plurality of radio frequency signals and the second plurality of radio frequency signals do not interfere with each other in their respective local regions.

16. The device of claim 10, wherein the millimeter-wave signal includes amplitude information and phase information.

17. The device of claim 10, wherein the millimeter-wave signal is demodulated by electro-optic sampling.

18. A non-transitory machine-readable medium, comprising executable instructions that, when executed by a processing system including a processor, facilitate performance of operations, comprising:
receiving video data via a millimeter-wave signal at a first radio frequency receiver located at a first power transformer that provides electrical power at a location, wherein a power of the millimeter-wave signal is limited so that the millimeter wave signal interacts with a first antenna at the first power transformer while not interacting with a second antenna at a second power transformer, and wherein the millimeter-wave signal is generated by converting an optical digital data signal; and
transmitting the video data by unicasting from the first power transformer to a modem at the location to deliver the video data to a plurality of end user devices at the location.

19. The non-transitory machine-readable medium of claim 18, wherein the millimeter-wave signal includes amplitude information and phase information, wherein the millimeter-wave signal is demodulated by electro-optic sampling.

20. The non-transitory machine-readable medium of claim 18, wherein a first plurality of radio frequency signals received at the first radio frequency receiver are associated with a first local region and wherein a second plurality of radio frequency signals received by a second radio frequency receiver are associated a second local region, and wherein the first plurality of radio frequency signals and the second plurality of radio frequency signals do not interfere with each other in their respective local regions.

* * * * *